L. R. LEMOINE.
MOLDING APPARATUS.
APPLICATION FILED MAR. 6, 1917.

1,299,967.

Patented Apr. 8, 1919.
7 SHEETS—SHEET 1.

WITNESS

INVENTOR

BY

ATTORNEY

L. R. LEMOINE.
MOLDING APPARATUS.
APPLICATION FILED MAR. 6, 1917.
1,299,967.
Patented Apr. 8, 1919.
7 SHEETS—SHEET 2.
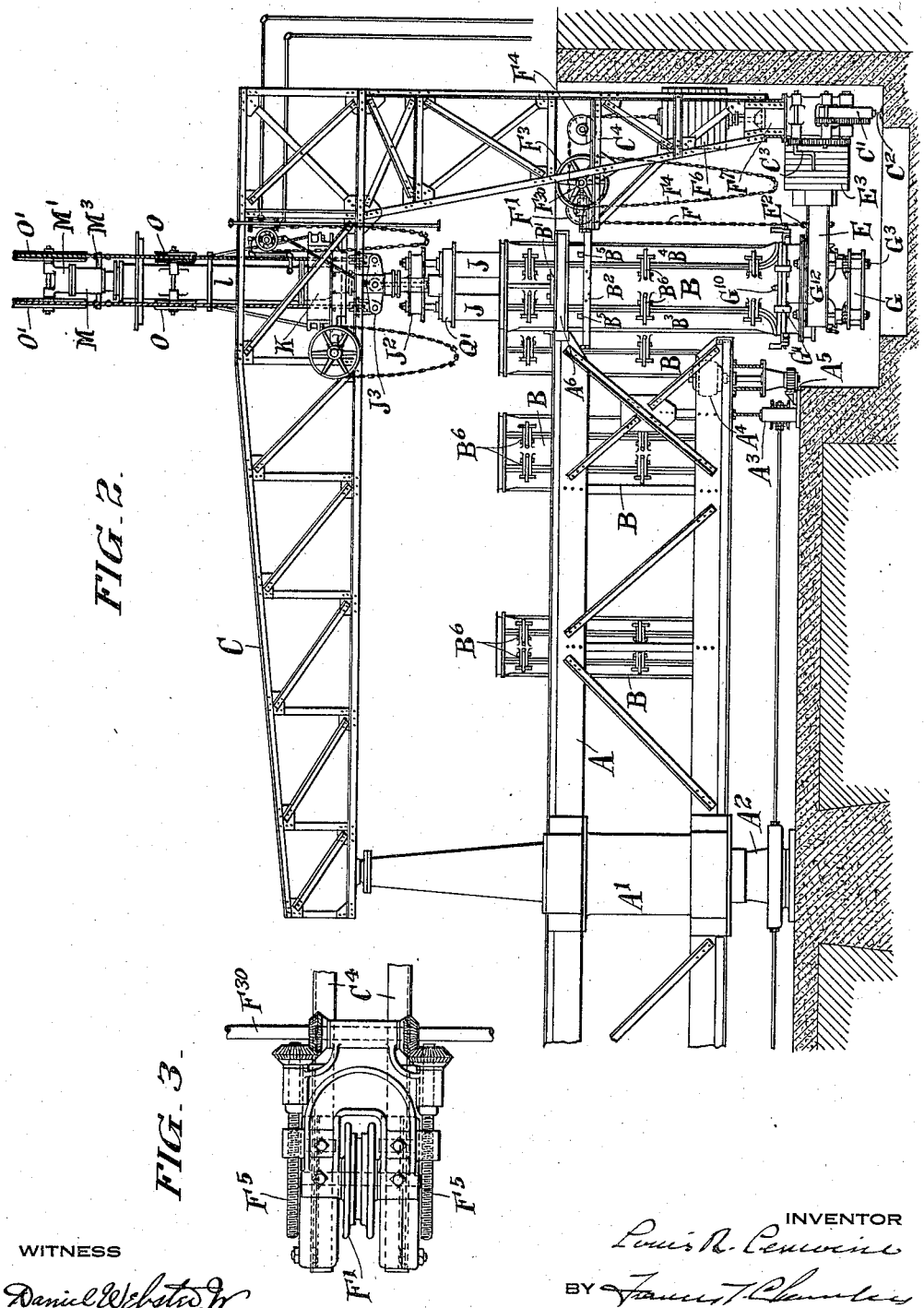
WITNESS
INVENTOR
BY
ATTORNEY

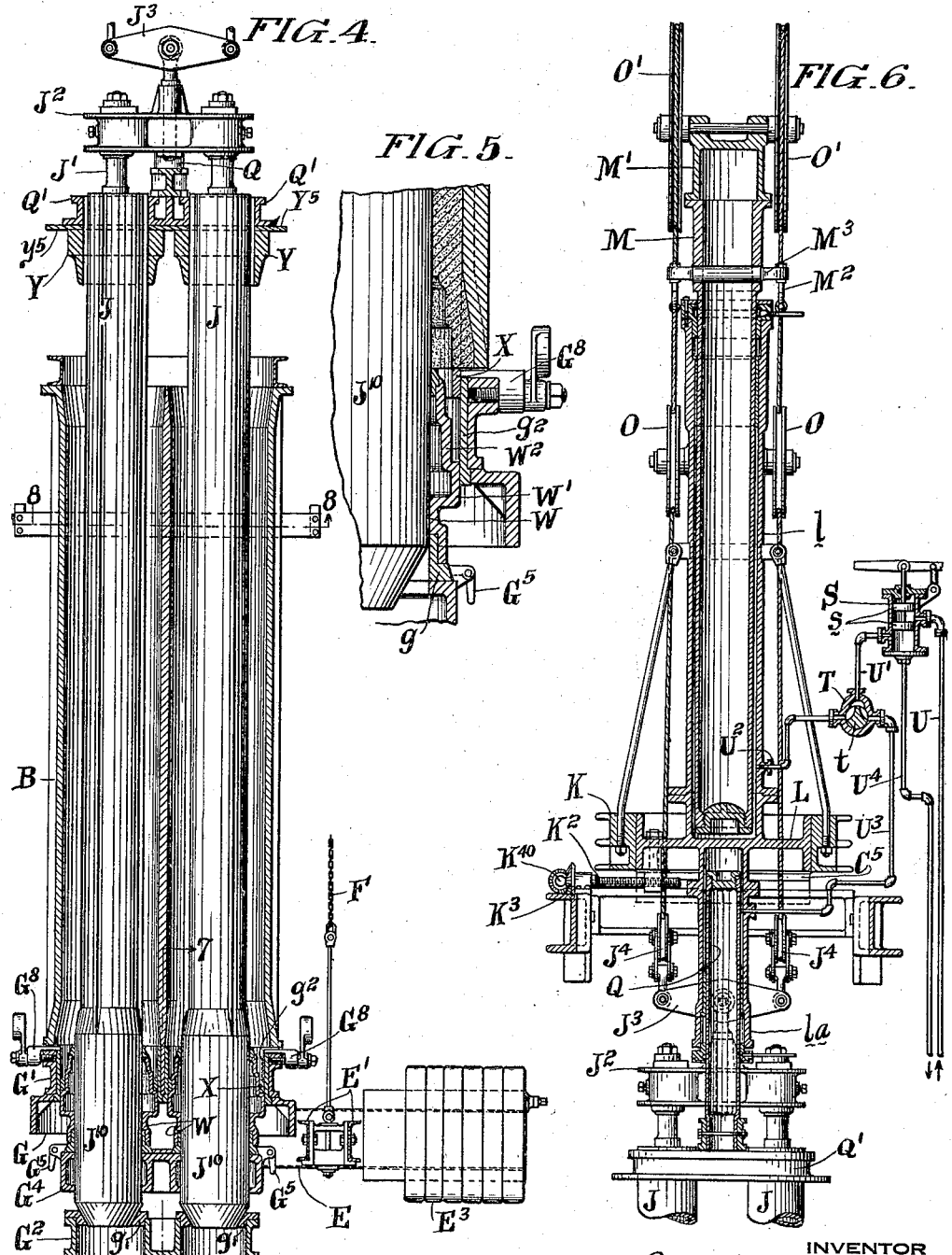

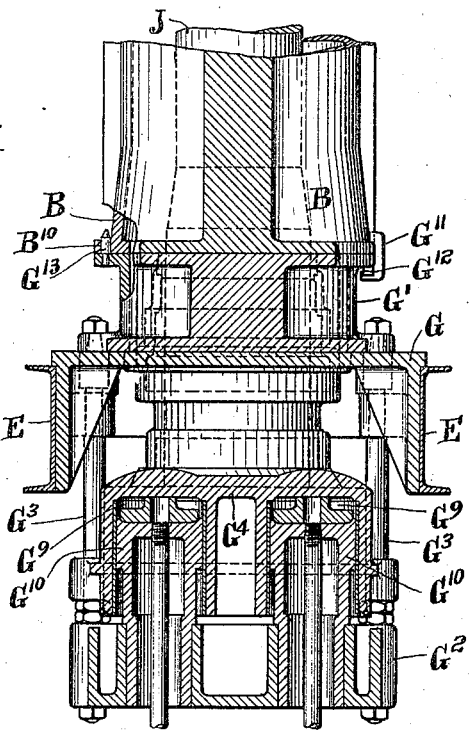
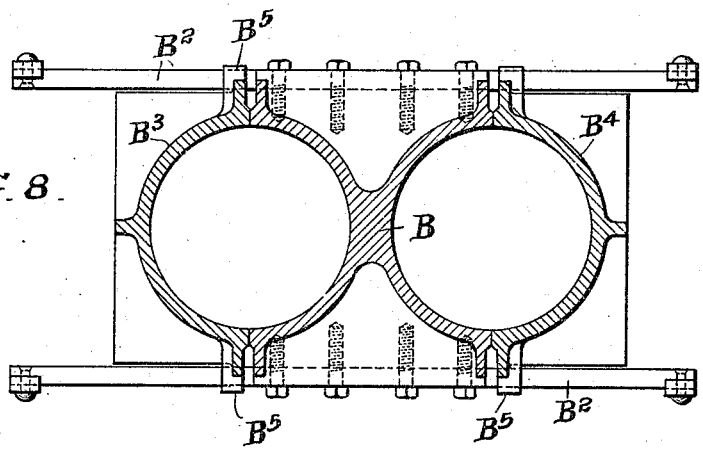

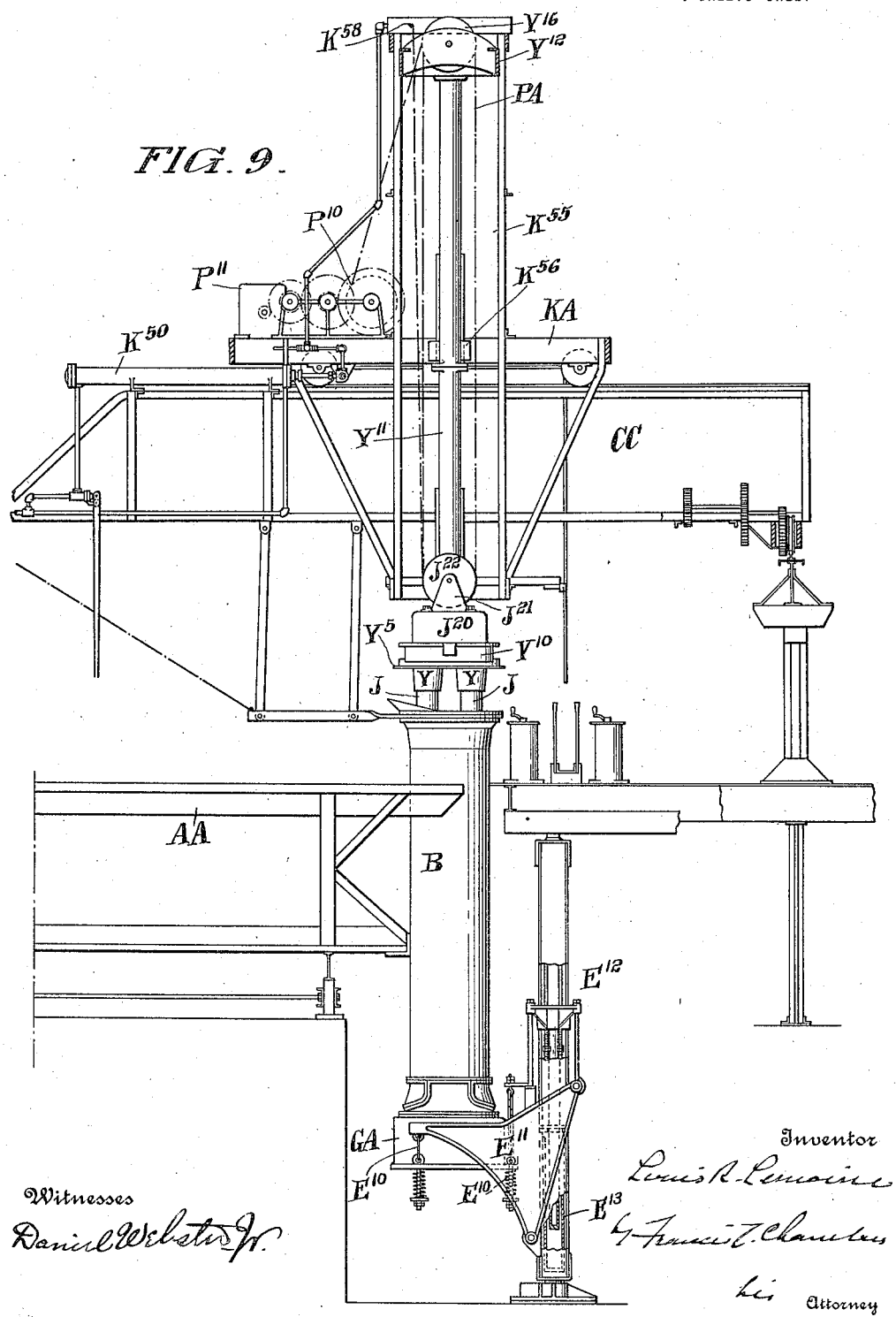

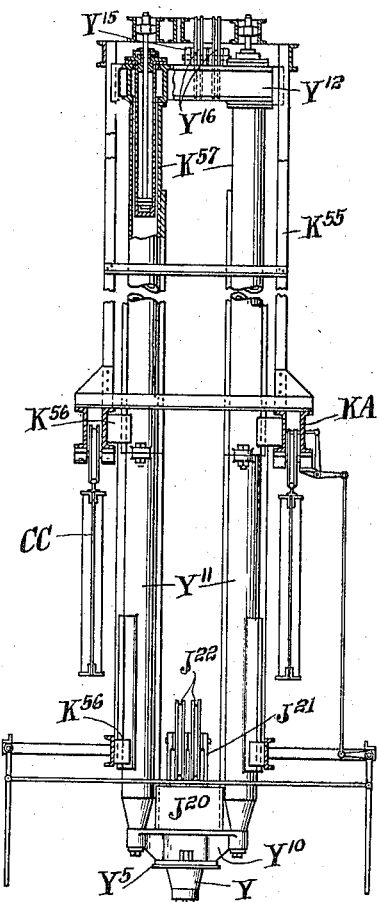
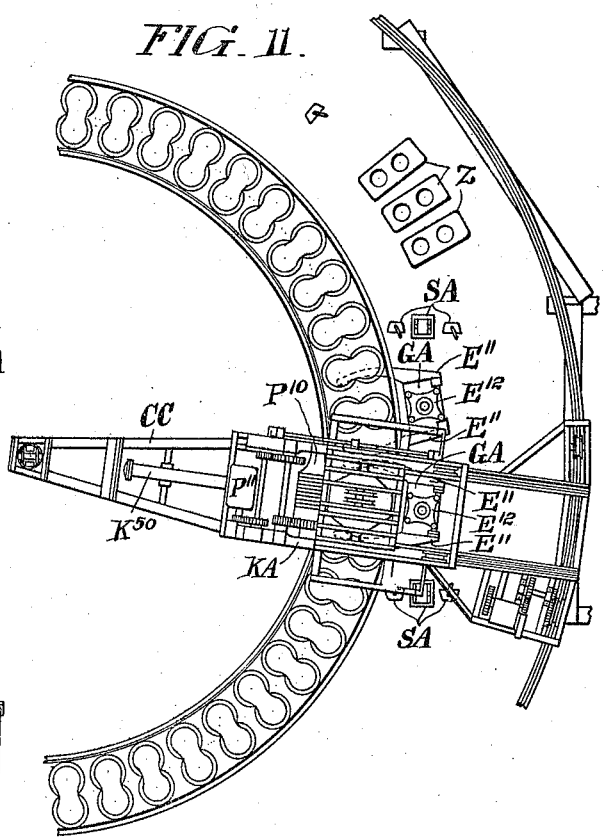
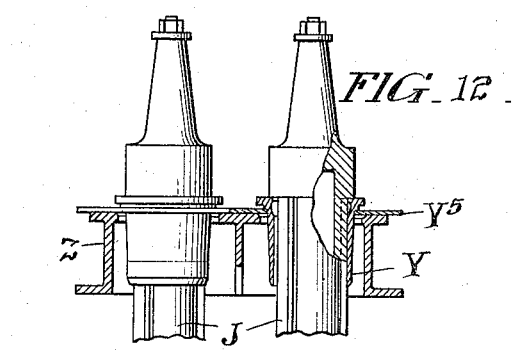

L. R. LEMOINE.
MOLDING APPARATUS.
APPLICATION FILED MAR. 6, 1917.
1,299,967.
Patented Apr. 8, 1919.
7 SHEETS—SHEET 7.
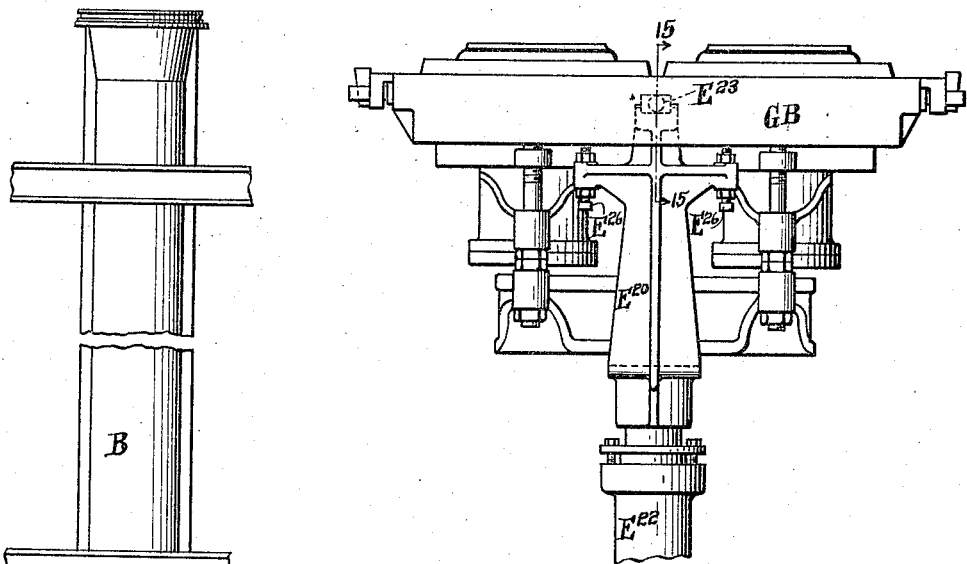
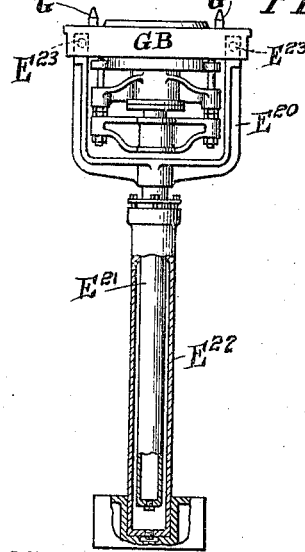
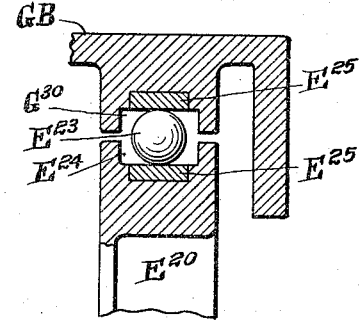

UNITED STATES PATENT OFFICE.

LOUIS R. LEMOINE, OF PHILADELPHIA, PENNSYLVANIA, ASSIGNOR TO UNITED STATES CAST IRON PIPE AND FOUNDRY COMPANY, OF BURLINGTON, NEW JERSEY, A CORPORATION OF NEW JERSEY.

MOLDING APPARATUS.

1,299,967.   Specification of Letters Patent.   Patented Apr. 8, 1919.

Application filed March 6, 1917. Serial No. 152,659.

*To all whom it may concern:*

Be it known that I, LOUIS R. LEMOINE, a citizen of the United States, and a resident of the city and county of Philadelphia and State of Pennsylvania, have invented certain new and useful Improvements in Molding Apparatus, of which the following is a true and exact description, reference being had to the accompanying drawings, which form a part thereof.

My present invention relates to molding apparatus of the kind in which molds are formed by the action of ramming patterns which are moved relatively to the mold flasks to compact the mold forming material with which the flasks are charged and thus form the mold cavities. The invention is especially devised for use in pipe molding apparatus of the type in which the body of a vertical pipe mold is formed by drawing up out of the mold a main ramming pattern comprising a stem portion about which the loose mold forming sand is charged, and a lower body or ramming portion of greater cross sectional area than the stem, which forces the sand outwardly and compresses it between the wall of the flask and the ramming portion of the pattern as the latter is drawn up through the mold flask; and in which the ends of the pipe mold are formed by the use of a riser or gate pattern forced into the upper end of the mold, and a socket pattern which is forced into the lower end of the mold.

The primary object of the invention is to provide simple and effective provisions for giving the ramming patterns the movements relative to the mold containing flasks necessary for the rapid and accurate formation of molds and the invention comprises improvements in the general arrangement of a pipe molding plant of the kind specified, and also comprises improvements in the socket pattern mechanism, and improvements in the means for manipulating the main and riser or gate patterns.

One general object of my invention is to provide for the accurate maintenance of the proper alinement of the patterns during the mold forming operation notwithstanding the fact that these patterns with their actuating mechanism are mounted on supporting means independent of, and relatively movable with respect to the flasks and their supporting means.

An important specific object of my invention is to provide mechanism for manipulating the main ramming pattern whereby the flask operated upon, while supported independently of the mechanism for supporting and moving the main pattern, is subjected by that mechanism to a reactive downwardly acting force opposing the upwardly acting force imparted to the flask through the sand by the resistance of the latter to the upward movement of the main ramming pattern in the mold forming operation.

In preferred forms of my invention the socket pattern mechanism is, in an analogous manner, provided with means whereby the said mechanism, while supported independently of the flask operated upon, will impart to the flask a downwardly acting thrust opposing the upwardly acting thrust transmitted to the flask through the sand as the socket pattern is forced into the mold.

The various features of novelty which characterize my invention are pointed out with particularity in the claims annexed to and forming a part of this specification. For a better understanding of the invention, however, and of the specific objects attained with it, reference should be had to the accompanying drawings and descriptive matter in which I have illustrated and described various preferred embodiments of my invention.

Of the drawings:

Fig. 2 is a partial sectional elevation taken at right angles to Fig. 1;

Fig. 3 is a plan illustrating a detail of construction;

Fig. 4 is a sectional elevation through the lower portion of the molding mechanism, the section being taken on the line 4—4 of Fig. 1;

Fig. 5 is a section taken similarly to Fig. 4 but showing a portion only of what is shown in Fig. 4 and taken on a larger scale than Fig. 4 and showing parts in different relative positions;

Fig. 6 is a section taken on the line 6—6 of Fig. 1, of the upper portion of the molding mechanism;

Figure 1:
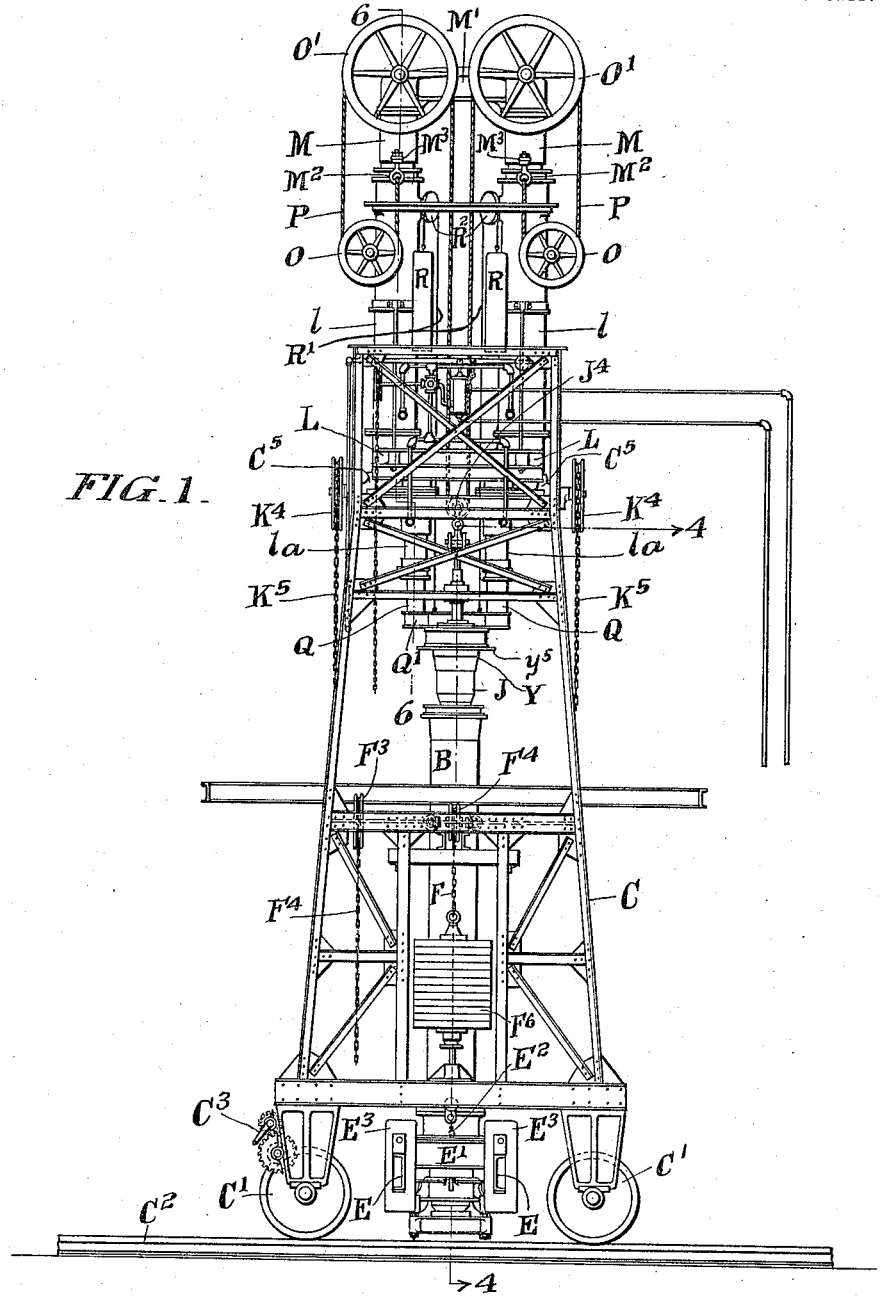
Figure 1 is an end elevation of the molding apparatus proper of a casting plant embodying my invention.

Fig. 7 is a partial section on the line 7—7 of Fig. 4;

Fig. 8 is a sectional plan taken on the line 8—8 of Fig. 4;

Fig. 9 is a view taken generally similar to Fig. 2, illustrating a modified form of pipe molding apparatus;

Fig. 10 is an elevation taken at right angles to Fig. 9 and partly in section, illustrating a portion of the apparatus shown in Fig. 9;

Fig. 11 is a plan view of a portion of a molding plant embodying the apparatus illustrated in Figs. 9 and 10;

Fig. 12 is a partial sectional elevation of a portion of the apparatus shown in Fig. 11;

Fig. 13 is an elevation of a portion of pipe molding apparatus embodying a third form of socket pattern mechanism, with parts broken away and in section;

Fig. 14 is a view taken at right angles to Fig. 13 but on a larger scale, and

Fig. 15 is a partial section taken on the line 15—15 of Fig. 14.

In the drawings and referring first to the construction shown in Figs. 1 to 8 inclusive, A represents a large flask carrier or turn table which revolves about the axis of its central post $A'$. As shown, the post or column $A'$ is pivotally mounted on the supporting base $A^2$, and the carrier is supported adjacent its periphery on rollers $A^3$, the shafts of which are radial to the axis of the carrier. $A^4$ represents a motor having a spur gear carried by its shaft in mesh with the circular rack $A^5$ underlying the outer edge of the carrier by means of which the carrier is rotated. Secured to the outer edge of the carriage A at regular intervals are the usual series of vertical flasks B. To simplify the illustration there are shown in Fig. 2 a part only of the flasks which are actually carried by the section of the casting machine illustrated which appears in Fig. 2. As shown, the flasks B are two mold flasks made in three parts, the central part of which comprises the wall of one half of each of the two molds formed in the flask and is formed with lugs $B'$ by which the flask is mounted on radial projections $A^6$ from the frame A. Secured to the central portion of the flask are bars $B^2$ which form rails on which the inner and outer sections $B^3$ and $B^4$, respectively, of the flask are suspended by the lug portions $B^5$. These lugs slide on the rails $B^2$ when the mold spaces in the molds are being opened and closed. The sections $B^3$ and $B^4$ are clamped to the body of the flask by the usual clamping devices $B^6$.

The mold forming mechanism is shown as mounted on an L shaped frame or crane C having vertical and horizontal leg portions, the vertical leg being connected at its upper end to the horizontal leg, and the latter being pivotally connected at its free end to the top of the column $A'$ of the carrier A. The lower end of the vertical leg of the frame C is mounted on wheels $C'$ running on a track $C^2$ concentric with the carrier A. $C^3$ represents a crank which is geared to one of the wheels $C'$ and furnishes a means for angularly adjusting the frame C about the common axis of this frame and the carriage A.

Since in the form shown the flasks are of the double mold type, there are two main ramming patterns J, two riser or gate patterns Y and two socket patterns W in use; the two patterns of each kind being ordinarily duplicates of each other and being mechanically connected and operated so as to move together. The means for actuating the main and riser patterns are mounted on the crane C above the flasks. The socket patterns W are carried by the movable element of a press or pattern actuator G which is carried by a supporting frame E extending under the path of the flasks. The frame E is suspended by means of the cable or chain F running over the pulleys $F'$ and $F^4$ mounted on the beams $C^4$ forming a part of the frame C. One end of the cable F is connected to frame E and the other end to the counterweight $F^6$. As shown, (see Fig. 3) the pulley $F'$, and thereby the frame E, may be adjusted toward and away from the axis of the carrier A by means of the threaded spindles $F^5$ screwed through threaded ears on the supporting bracket or sheave for the pulley wheel $F'$. The threaded spindles $F^5$ may be rotated by means of the chain wheel $F^3$ and operating chain $F^4$. The wheel $F^3$ is secured to a shaft $F^{30}$ mounted in the frame C and connected by bevel gears to the spindles $F^5$. The counterweight $F^6$ is advantageously made slightly heavier than the frame E and the load carried thereby, and a fluid pressure cylinder $F^7$ is employed to adjust the counterweight $F^6$ and thereby the frame E in a vertical direction. As shown, the flexible element F is connected to a staple $E^2$ at the center of the crossbar portion $E'$ of the frame E which is H shaped. Each of the legs, or side members of the frame E, supports at one side of the crossbar $E'$, a counterweight $E^3$ which may be adjusted as required to balance the mold forming mechanism supported between the opposite ends of the legs or side members of the frame E.

The socket pattern press G comprises a main frame member secured to the supporting frame E, a frame member $G'$ mounted directly on, and secured to the main frame member of the press, and a frame member $G^2$ suspended therefrom by the bolts $G^3$. The bolts $G^3$ form guides for the movable socket pattern support $G^4$. The members G', G² and G⁴ as well as the main frame member of the press G are all alike in that each is formed with a pair of passages each coaxial with the corresponding main pattern J and the corresponding mold space of an alined flask B. As shown, the lower end of the enlarged ramming portion $J^{10}$ of each main pattern is conical and is initially received in and centered by a bushing or socket member $g'$, mounted in the corresponding passage through the member G². The member G⁴ is formed with seats for bushings $g$ secured in place by the latches G⁵ and each forming a bearing guide for the ramming portion $J^{10}$ of the corresponding main pattern J, and also as a centering device for the lower end of the corresponding socket pattern W. The latter is formed with an enlarged central cylindrical portion W' which has a sliding fit in a corresponding bushing or sleeve $g^2$ mounted in the frame member G'. Immediately above the pattern portion W' is a smaller cylindrical pattern portion W² and between this portion of the socket pattern and the sleeve $g^2$ there is normally located a stripping ring X. When the socket pattern is moved upward in ramming the lower end of the mold, the ring X is carried from the position shown in Fig. 4 into the position shown in Fig. 5 and is then locked in its elevated position by the clamping device G⁸ so that the ring X may perform its stripping function when the corresponding socket pattern W is thereafter removed. To raise the pattern support G⁴ and the socket patterns carried thereby in ramming the lower end of the mold, I provide the support G⁴ with piston chambers G⁹ (see Fig. 7) which are open at their lower ends and receive pistons $G^{10}$ having their lower ends mounted in the frame member G². Suitable valve mechanism, which it is not necessary to describe, is employed to control the admission to and exhaust from the piston chambers G⁹ of water under pressure or other operating fluid.

In operation, the frame member G' of the socket pattern press G is securely clamped to the lower end of the flask B, as by means of the clamps $G^{11}$ and wedges $G^{12}$ shown in Fig. 7. With this arrangement it will be apparent that the reaction to the upward thrust imparted to the pattern support G⁴ to force the socket patterns W up into the mold, is sustained by the flask B through the clamps $G^{11}$. Neither this thrust nor its reaction puts any load on the supporting chain or cable F, or on the carrier A. While the frame E and its load will ordinarily weigh several tons, this weight is so distributed and balanced that the frame E may be adjusted as required to swing the press G into and out of its operative position under the flasks. As shown, the press G carries tapered dowel pins $G^{13}$ adapted to enter apertures $B^{10}$ formed to receive them in the lower flange of each flask B. The frame E is manually adjusted to insure the entrance of the dowel pins in the apertures as the flask is raised. The pins and apertures then coöperate to give such further lateral adjustment to the press as is necessary to secure the desired accurate register between the press and flask as they engage. The flexible suspension for the press G also permits such angular adjustment of the press G about a horizontal axis as is required to snugly seat the upper surface of the member G' of the press against the lower end edge of the flask notwithstanding any slight divergence of the longitudinal axis of the latter from its normal vertical disposition.

The mechanism for pulling the patterns J up through the flasks to thereby form, by ramming, the body portions of the molds, and the mechanism for forcing the gate forming or riser patterns Y down into the upper end of the mold, is mounted on a frame or carriage K. The latter is slidingly mounted on the rails C⁵ (see Figs. 1 and 6) forming a part of the horizontal leg of frame C to permit of the adjustment of the frame K toward and away from the axis of the carrier A. To effect this adjustment, the threaded shafts K² are mounted in the frame work C to have rotative but not axial movements. These shafts are connected by spur gears K³ to a shaft $K^{40}$ which carries at its ends operating wheels K⁴ over which run operating chains K⁵. The threaded shafts K² are screwed through threaded nut portions of the frame K.

Forming a part of the sliding frame K are two cylinder members L each of which is formed with an upper cylinder $l$ open at its upper end, and with a smaller cylinder $l^a$ open at its lower end. The two cylinder members L are on opposite sides of a plane radial to the carrier A and including the axes of the patterns J. Working in the cylinders $l$ are plungers M which are connected to, and give vertical movements to the main ramming patterns J, while plungers Q working in the cylinders $l^a$ are connected to, and give vertical movements to the mold engaging element of which the riser or gate patterns Y form a part. This mold engaging element comprises a crosshead Q' to which the plungers Q are connected, and to which the riser patterns Y are connected. The riser patterns or the crosshead Q are preferably provided with a follower plate or flange Y⁵ which directly engages the flask operated on when the riser patterns are fully entered in the mold. The static weight of the plungers Q, crosshead Q' and patterns Y is slightly overbalanced by the counterweights R. The cables R' connecting the counterweights R to the crosshead Q' run over pulleys R² journaled on the cylinder member L.

The two plungers M are connected at their upper ends by the crosshead M'. A pair of cables P are employed to connect the pistons M to the patterns J. As shown, the two ends of each cable P are secured one to one piston M and the other to the second piston M, each cable end being secured by an eyebolt M² to the corresponding end of a crossbar M³ passing through the corresponding piston M above the upper end of the cylinder l receiving it. From each eyebolt M² the adjacent portion of the cable passes under a pulley O journaled on the corresponding cylinder l and having its axis below the upper end of the cylinder, and then passes up and over a pulley O' which is journaled on the crosshead M'. The bight of the cable P depending from between each adjacent pair of pulleys O' passes around a pulley J⁴ which is link connected to the corresponding end of an equalizing lever J³ pivotally connected at its center to the center of a crosshead J² to which the reduced upper ends J' of the main patterns J are connected. With the arrangement described it will be apparent that the upward movements of the patterns J will be three times as great as the upward movements of the actuating plungers M thus reducing the plunger travel and the amount of head room required.

In Fig. 6 I have somewhat diagrammatically illustrated a simple pipe and valve arrangement for supplying pressure fluid to and permitting it to exhaust from the cylinders l and lª to effect the different operations hereinafter referred to. S represents the main control valve shown as a piston valve. A supply pipe U is connected to the barrel of the valve midway between its ends. U⁴ is an exhaust pipe connected to the lower end of the valve barrel. A port in the valve barrel between the ports to which the pipes U and U⁴ open, is connected by a pipe U' to the supply port of a three way valve T. When the valve member s of the valve S is in the position shown in Fig. 6, the supply of pressure fluid through the pipe U is cut off and the pipe U' is in free communication with the exhaust pipe U⁴. When the valve s is lowered, communication between pipes U' and U⁴ is interrupted and communication between pipes U and U' established. The three-way valve T has an inlet port to which the pipe U' is connected, and has an outlet port connected by the branched pipe U² to the cylinder l, and a diametrically opposed outlet port connected by the branched pipe U³ to the cylinder lª. The valve t working in the casing of the valve T is so formed that in one position, that shown in Fig. 6, the three ports to which the pipes U', U² and U³ open, are in communication with one another, while in other positions, it may close the port to which the pipe U' is connected, or may close either of the ports to which the pipes U² and U³ are connected while connecting the other of these ports with the port to which pipe U' is connected.

With the apparatus shown in Figs. 1 to 8, a mold forming operation is started by bringing an empty flask B into alinement with the patterns J which are then suspended above it. During this stage of operation the cylinders l will be filled with the pressure fluid and the patterns J held thereby in their elevated positions, while the cylinders lª will be empty and the patterns Y held by the counterweights R in their elevated positions. Ordinarily the carrier A is intermittently advanced from time to time to move a mold filled flask out of the molding position and to bring an empty flask into position. Should any such angular advance movement of the carrier A be a little greater or a little less than the angle corresponding to the spacing of the flasks, it is a simple matter to move the crane C, by manipulating the crank C³, to effect the desired alinement of the patterns and flask. After this alinement is effected, the pressure fluid is permitted to exhaust from the cylinders l whereupon the patterns J descend into the flask. While the patterns J are thus being inserted into the molds, the frame E will ordinarily be manipulated to bring the socket pattern press G into register with the bottom of the flask, and to secure it thereto so that when the patterns J descend to the proper level their conical lower ends are received in the bushings g'.

The flask operated upon is then charged with mold forming sand after which the valves S and T are adjusted to connect the various cylinders l and lª to the pressure fluid supply source. This forces the gate patterns Y home into the upper end of the mold, and draws the main patterns J up through the mold. The aggregate cross sectional area of the plungers M is made approximately three times that of the aggregate cross sectional area of the plungers Q so that during this stage of operation, the upward thrust imparted to the flask through the sand by the slow moving patterns J will approximately balance the downward thrust on the mold of the mold engaging element to which the plungers Q are connected. The resistance to the downward movement of the riser patterns Y throughout their full downward movement will ordinarily be less than the force required to give the patterns J their initial upward movement. In consequence the upward movement of the main patterns J will ordinarily not start until after the flange Y⁵ of the mold engaging element seats snugly against the upper end of the flask. When the mold engaging element thus directly engages the flask, the pressure in the cylinders $l$ and $l^a$ quickly builds up to the amount required to effect the upward movement of the main patterns.

After the main patterns are drawn up through the mold, the valve T is manipulated to close communication between the pipe U' and the cylinder $l$ thus locking the plungers M and patterns J in their elevated position, and the valve S is then manipulated to connect the cylinders $l^a$ to exhaust whereupon the riser patterns are drawn out of the mold by the action of the counterweights R.

Prior to, or during the initial upward movement of the main patterns J, pressure fluid is admitted to the cylinders $G^9$ of the socket pattern press G, and the socket patterns W are thereby forced into the lower end of the mold.

After the ramming portion $J^{10}$ of the main pattern has compacted the portion of the mold immediately above the socket patterns W, the latter may be withdrawn. In the withdrawing operation, the extreme lower portion of the mold is protected against crumbling by the stripping rings X which are then held in their elevated position by the locking device $G^8$. After the socket patterns have descended the locking devices $G^8$ are released and the stripping rings are then free to drop down into contact with the supporting shoulders of the socket patterns W. The removal of the clamps $G^{11}$ and the disengagement of the lower mold forming devices from the mold then completes the mold forming operation. The carrier A may then be advanced to present an empty flask to the mold forming apparatus.

With the provisions made for angularly adjusting the frame C, and for moving the carriage K radially toward and away from the axis of the carriage C, it is possible not only to compensate for any slight irregularity in the angular adjustment of the carrier A, but it is also possible to compensate for any irregularity in the form of the carriage, or in the form of the flask or in the connections between the flask and carriage which interfere with an absolutely symmetrical disposition and equality of spacing of the flasks.

With the apparatus described it will be apparent that accurate alinement of the main patterns J will be preserved throughout the upward mold forming movement of the latter inasmuch as these patterns then travel in guided relation with parts which are held in rigid relation with the flask operated upon through the engagement of the latter by the mold engaging element including the patterns J. The latter preferably serve in a known manner to directly engage and guide the main patterns J as the latter are withdrawn. Similarly the rigid engagement of the frame element of the socket pattern press G with the lower end of the flask insures the maintenance of the desired alinement of the socket patterns W as the latter are forced into and withdrawn from the lower end of the mold.

In casting apparatus of the general type disclosed the molds are formed, dried, poured, the castings removed and the flasks cleaned ordinarily at different stations past which the rotation of the carrier A moves the different flasks B in regular succession. These different operations are ordinarily being carried out at the same time in connection with the different flasks and by different workmen, or by different groups of workmen. It sometimes happens that for one reason or another, it may be possible and desirable to form molds for a limited period at a rate more rapid or less rapid than that at which the other operations are carried out. This may readily be accomplished with the apparatus shown in Figs. 1 to 8, since the angular adjustments of the crane C provided for, permits of the operation of all the mold forming apparatus on flasks occupying positions at either side of what may be regarded as the normal position of the flask in which a mold is being performed.

In the modified pipe molding apparatus illustrated in Figs. 9 to 12 inclusive, the turn table or flask carrier AA and the flasks B may be the same as in the construction first described, and the mechanism for handling the main and riser patterns are supported on an overhead crane CC which may be generally like the crane C of the construction first described. In this construction, however, the socket pattern presses GA, of which there are two, are supported independently of the crane CC. The mechanism for operating the main and riser patterns shown in Figs. 9 to 12, are mounted on a carriage KA radially adjustable with respect to the turn table AA by means of a piston and cylinder fluid pressure motor $K^{50}$ connected between the crane and carriage KA, and provisions are made for sufficient radial movement of the carriage KA to carry the main and riser patterns J and Y, respectively, to the outer side of the path of travel of the flasks when desirable as in changing from one size or style of these patterns to another. The carriage KA for operating the main and riser patterns carries a tower structure $K^{55}$ in which the riser patterns Y and the main ramming patterns J are mounted with provisions for guiding them in their vertical movements.

The riser patterns Y are secured to the lower end of a mold engaging element or riser pattern frame comprising a lower crosshead $Y^{10}$, a pair of vertical strut elements $Y^{11}$, and an upper crosshead $Y^{12}$. The upper crosshead is guided by its engagement with vertical elements of the tower structure $K^{55}$, and the latter is provided with guides $K^{56}$ for the strut elements $Y^{11}$. The cylinders $K^{57}$ and coöperating pistons of two fluid pressure motors are connected respectively to the upper end of the mold engaging element and to the tower $K^{55}$, and make possible a certain limited vertical adjustment of the latter. The main ramming patterns J pass through and are guided by the riser patterns Y and are connected at their upper ends to a crosshead $J^{20}$ which is vertically movable in guided relation with the strut members $Y^{11}$ of the riser pattern frame.

In the mold forming operation the necessary upward pull is applied to the main ramming patterns by a block and tackle connection which includes a block $J^{21}$, shown as comprising two pulleys $J^{22}$ secured to the crosshead $J^{20}$, a block $Y^{15}$, shown as comprising two pulley wheels $Y^{16}$, mounted on the crosshead $Y^{12}$ of the riser pattern frame, and a fall PA, which runs about the various pulleys $J^{22}$ and $Y^{16}$, and has its standing end connected to the tower $K^{55}$ at $K^{58}$, and has its running end wound around a winding drum $P^{10}$ mounted on the carriage KA. The latter is geared to and operated by a reversible electric motor $P^{11}$, also mounted on the carriage KA.

In the normal operation of the main and riser pattern actuating mechanism of Figs. 9 to 12, the riser patterns Y are held in their elevated position above the flasks B, by pressure fluid admitted to the cylinders $K^{57}$ until the main ramming patterns J have been lowered into the flask and the latter charged with sand. Preferably the fluid pressure is maintained in the cylinders $K^{57}$ during the initial portion of the main ramming operation. This operation is brought about after the flask is charged with sand, by starting the electric motor $P^{11}$ into operation to wind up on the drum $P^{10}$, the running end of the fall PA which forms a part of the block and tackle connection between the main ramming patterns JA and the mold engaging element. This tension of the fall PA tends to draw the mold engaging element downward and the main ramming patterns J upward. The parts are preferably so proportioned that with the normal pressure at which the pressure fluid is supplied to the cylinders $K^{57}$, the normal resistance to the upward movement of the patterns J through the sand is largely in excess of the resistance to the full downward movement of the mold engaging element. The riser patterns Y are consequently forced down into the mold the full depth and the flange plate $Y^5$ forming a part of the mold engaging element brought into engagement with the upper end of the flask, before the main ramming patterns J start to move upward. After the mold engaging element is thus seated on the flask and further relative movement between these parts is thus prevented, the main ramming patterns J begin to move upward and their upward movement continues until these patterns are drawn clear of the mold. After a considerable portion of the upward movement of the main patterns is completed, the pressure in the cylinders $K^{57}$ is preferably released. This insures that when the main ramming patterns J approach the upward limit of their movement and the resistance to their movement decreases, there will be no tendency to a premature lifting of the mold engaging element. After the patterns J are entirely withdrawn from the molds, pressure fluid is again admitted to the cylinders $K^{57}$ whereupon the mold engaging element with the riser patterns Y carried by it, are lifted clear of the flask.

The mechanism shown in Figs. 9 to 12, forms a desirable means for giving the main ramming patterns J and the riser patterns Y the same guided movements, and for applying the same opposing or counterbalancing forces to the flask as are had with the apparatus shown in Figs. 1 to 8 inclusive. While the main and riser pattern operating mechanism of Figs. 9 to 12 inclusive thus embodies various generic features of my present invention, this mechanism also comprises various novel specific features of invention made by James B. Ladd and claimed in his copending application, Serial No. 152,578, filed March 6, 1917, wherein this mechanism is illustrated and described in detail.

The socket pattern press GA employed in Figs. 9 to 12 may or may not be identical with the press G of Figs. 1 to 8 but in either event is shown as supported in a somewhat different manner. As shown, the press is supported by three flexible elastic connections $E^{10}$ from a vertically movable crane arm or boom $E^{11}$ which is mounted on a vertical crane column $E^{12}$, which may be rotated about a vertical axis to swing the press GA carried by it into and out of the position in which it lies beneath the path of the flasks. The crane arm or boom $E^{11}$ is raised and lowered by means of a fluid pressure piston and cylinder motor $E^{13}$ connected between the crane arm $E^{11}$, and the crane column $E^{12}$. The socket pattern press supporting mechanism, while a desirable embodiment of generic features of the present invention, also comprises specific features of novelty invented by the beforementioned Ladd and claimed in his copending application, Serial No. 152,577, filed March 6, 1917, wherein there is also disclosed and claimed, a modified form of socket pattern press which may be used in carrying out the general features of my present invention in lieu of the socket pattern press G forming a part of the mechanism shown in Figs. 1 to 8 inclusive.

Advantageously as shown, where the socket patterns are supported independently of the mechanism for operating the main and riser patterns there are two socket pattern presses GA provided, each with its individual supporting crane. This permits one press GA to be swung out of the path of the flasks to permit the socket patterns carried thereby to be changed from one size or style to another, while the other socket pattern mechanism is in operation. The main and riser patterns which may ordinarily be changed more expeditiously than are the socket patterns are changed after the carriage KA has been radially moved outward from the center of the turn table to bring the tower $K^{55}$ above the idle pattern stools or supports Z shown in Figs. 11 and 12. As shown, these supports Z comprise open frames through which the idle main patterns J supported thereby depend, and in which they are held by their engagement with the corresponding riser patterns Y, which then bear on the margin of the supports as shown clearly in Fig. 12. As shown in Fig. 11, control devices SA for the various motors employed in the molding operation are advantageously duplicated at two stations for the convenient operation by an operator or operators at one or the other of the two stations according as one or the other of the two socket pattern mechanisms are in use.

Instead of supporting the socket pattern mechanism by means lying without the path of the flasks as in the constructions previously described, I may mount the socket pattern press on a support located strictly beneath the flask to be operated on as in the construction shown in Figs. 13, 14 and 15. In these figures, the socket pattern press GB, which may or may not be identical with the press G, is shown as mounted in a yoke $E^{20}$ carried at the upper end of a plunger $E^{21}$ working in a cylinder $E^{22}$. To permit of the desirable accurate register of the press and the flask operated upon, notwithstanding slight irregularities in the disposition of the latter on its support, or a failure to give the latter accurate intermittent movements of advance, the socket pattern press GB is connected to the yoke $E^{20}$ with freedom for some adjustment. The connection provided in the form shown comprises a pair of steel balls $E^{23}$ resting in upwardly opening pockets $E^{24}$ formed in the upper ends of the arms of the yoke member $E^{20}$ on which the socket pattern press frame rests at points on the opposite sides of the center of gravity of the latter. As shown, the socket pattern press frame is formed with pockets $G^{30}$ open at their under sides to receive these balls. Advantageously the bottoms or inner ends of the pockets $E^{24}$ and $G^{30}$ are formed by steel plates $E^{25}$. With this construction the socket press frame is permitted such a limited horizontal movement in any direction to insure accurate register of the press and flask, after the upper ends of the tapered dowel pins $G^{13}$ carried by the press enter the corresponding apertures in the flask. The press GB is also free to turn slightly about a horizontal axis passing through the center of the two balls to accommodate any such variation in the inclination of the plane of the lower end of the flask as is liable to occur. Undue accidental tilting movement of the press frame about this axle is prevented by the adjustable stop bolts $E^{26}$ carried by the yoke.

While the socket patterns press GB shown in Figs. 13, 14 and 15 may be clamped to the lower edge of the flask during the mold forming operation just as is the socket pattern press of the construction shown in Figs. 1 to 8, the press GB in the construction shown in Figs. 13, 14 and 15, may be moved upward against the flask by its supporting plunger with sufficient force to make any clamping means unnecessary where the necessary upward thrust of the socket pattern in the mold forming operation does not exceed the weight of the flask with the load carried by it, or where the flask is otherwise held with sufficient firmness by its supporting mechanism. In each form of apparatus shown the socket pattern press employed may be easily adjusted by its supporting mechanism to coöperate with flasks of different lengths thus adapting the apparatus to the manufacture of pipes of different lengths as well as of different diameters and styles.

While in accordance with the provisions of the statutes I have illustrated and described the best forms of my invention now known to me, it will be apparent to those skilled in the art that changes can be made in the form of my invention without departing from its spirit, and that in some cases some features of my invention can be used to advantage without a corresponding use of other features of the invention.

Having now described my invention, what I claim as new and desire to secure by Letters Patent, is:

1. The combination with mold supporting means, of a main ramming pattern adapted to be drawn through the mold, an end pattern adapted to bear against the mold at one end thereof, and means for utilizing each of said patterns as a reaction point from which to apply a force to the other pattern in forcing the end pattern against the mold and drawing the main pattern out of the mold past said end pattern.

2. The combination with mold supporting means, of a main ramming pattern adapted to be drawn through the mold, an end pattern adapted to bear against the mold at one end thereof, and means for exerting a force acting between said patterns in the direction to force said end pattern against the mold and to draw the main pattern out of the mold past said end pattern.

3. In pipe molding apparatus the combination with a vertical mold flask and its supporting means, of a pattern ramming mechanism comprising a support independent of said flask supporting means and extending over said flask, a ramming pattern adapted to be drawn through said flask and means mounted on said support for simultaneously applying an upwardly acting force to said pattern to draw the latter out of the flask through the upper end thereof and a downwardly acting reactive force to the flask.

4. In pipe molding apparatus the combination with a vertical mold flask and its supporting means, of a pattern ramming mechanism comprising a support independent of said flask supporting means and extending over said flask, a main ramming pattern adapted to be drawn through said flask, an end pattern adapted to surround the main pattern and bear against the upper end of the mold, and means mounted on said support for exerting a force between said patterns tending to force the end pattern down against the mold and to draw the main pattern up out of the mold through said end pattern.

5. In a pipe molding machine, a traveling flask support, vertical flasks mounted thereon, a supporting structure extending over the path of travel of said flasks, a mold forming mechanism mounted thereon above the flasks and comprising a mold compacting element and a coöperative element for impressing a reactive force on a flask opposing that exerted on the flask by the first mentioned element in a mold compacting operation.

6. In a pipe molding machine, a traveling flask support, vertical flasks mounted thereon, an independent support extending over said flasks, and a pattern ramming mechanism mounted thereon and comprising a main ramming pattern puller and an end pattern depresser.

7. In a pipe molding machine, a turntable, vertical flasks mounted thereon, a movable crane arm extending over the said flasks and turning about the axis of said table, a pattern ramming mechanism mounted on said arm and adjustable toward and away from said axis.

8. In a pipe molding machine, a turntable, vertical flasks mounted thereon, an independent support extending over said flasks, a horizontally adjustable pattern ramming mechanism mounted thereon and comprising a main ramming pattern puller and an end pattern depresser.

9. In a pipe molding machine, a turntable, vertical flasks mounted thereon, a movable crane arm extending over said flasks and turning about the axis of said table, a pattern ramming mechanism mounted on said arm and comprising a pattern ramming element and a coöperating element for impressing a reactive force on the flask opposing that exerted on the flask by the other element in the pattern ramming operation.

10. In a pipe molding machine the combination with means for supporting a vertical mold flask, of means for drawing a ramming pattern up through the mold, and forcing a surrounding pattern down against the upper end of the mold, said last mentioned means comprising a common support and fluid pressure mechanism mounted thereon for simultaneously applying a downwardly acting force to said surrounding pattern, and an upwardly acting force to said ramming pattern.

11. In a pipe molding machine the combination with vertical mold flasks, of a press above the flask level and a press below the flask level, supporting means for said presses, and independent supporting means for the flasks movable relative to said press supporting means to carry said flasks successively into and out of register with said presses, each of said presses comprising a vertically movable pattern ramming element, and a second element vertically movable into and out of operative engagement with the flask and guiding the corresponding pattern ramming element in its operation.

12. In a pipe molding machine the combination with vertical mold flasks, of a press above the flask level and a press below the flask level, supporting means for said presses, and independent supporting means for the flasks movable relative to the press supporting means to carry said flasks successively into and out of register with said presses, each of said presses comprising a vertically movable pattern ramming element, and a second element vertically movable into and out of engagement with the flask and adapted to apply to the flask a reactive force opposing the force to which the flask is subjected by the corresponding pattern ramming element in the ramming operation.

13. In a pipe molding machine the combination with a vertical pipe mold flask, of a ramming pattern mechanism supported independently of said mold flask and comprising a vertically movable pattern ramming element and a second element vertically movable into and out of engagement with the mold flask and adapted to apply to the mold flask a reactive force opposing the force to which the flask is subjected by the said pattern ramming element in the ramming operation.

14. In a pipe molding machine the combination with a turn-table, vertical flasks mounted thereon and successively advanced thereby through a mold forming station, a socket pattern mechanism located at said station and movable vertically into and out of operative relation with the flask at said station, a main ramming pattern adapted to be inserted in the flask, and pattern drawing mechanism located at said station and adapted to engage the upper end of said main ramming pattern and draw the same up out of the flask.

15. In a pipe molding machine the combination with a flask and means for supporting the same in a vertical position, of a vertically adjustable support and a pattern ramming press mounted on said support with freedom for horizontal adjustment.

16. In a pipe molding machine the combination with a flask and means for supporting the same in a vertical position, of a pattern ramming press and supporting means therefor permitting the adjustment of the press angularly about a horizontal axis.

17. In a pipe molding machine the combination with a flask and means for supporting the same in a vertical position, of a socket pattern ramming press, said press and flask having coöperating provisions for laterally adjusting the press relative to the flask as the press is raised into engagement with the flask, and means for raising and lowering the press to which the latter is connected with freedom for lateral adjustment.

18. In a pipe molding machine the combination with a flask and means for supporting the same in a vertical position, of a socket pattern mechanism comprising a press, a flexible suspension for holding said press beneath the flask and means for clamping said press in operative position.

19. In a pipe molding machine the combination with a vertically adjustable socket pattern ramming mechanism comprising two coöperating relatively movable press elements, of a traveling flask support, a vertical flask carried thereby into and out of the position in which it stands over said mechanism, a socket pattern carried by one of said press elements and means for securing the other press element to the flask.

20. Pipe molding apparatus comprising in combination a flask, means for moving it past a molding station, molding mechanism located at said station and comprising a suspended frame adapted to be secured to the lower end of said flask, a pattern mounted therein, and hydraulic means carried by said frame for forcing said pattern up into the lower end of the flask.

21. Pattern ramming mechanism for operating at the under side of a flask open at its under side, comprising in combination, a supporting structure at the side of said flask, an upwardly acting pattern ramming press located beneath said flask and connected to said structure by means permitting both a horizontal and a vertical adjustment of the press and an adjustment to vary the inclination of the line of action of the press to the horizontal.

22. Pattern ramming mechanism for operating at the under side of a flask open at its under side, comprising in combination, a supporting structure at the side of said flask, an upwardly acting pattern ramming press located beneath said flask and connected to said structure by a flexible suspension.

23. Pattern ramming mechanism for operating at the under side of a flask open at its under side comprising, in combination, a supporting structure at the side of said flask, an upwardly acting pattern ramming press located beneath said flask and connected to said structure by means including a flexible suspension and means for raising and lowering said press.

24. In a pipe molding machine a series of pipe flasks, and means for intermittently advancing them along a regular path through a pipe molding station, mold forming devices located and normally operating on a flask temporarily disposed at said station but adjustable along said path to permit the mold forming operation to be performed on a flask located at one side of said station.

25. In a pipe molding machine the combination with means for supporting a flask in a mold forming position, of separately movable main and end ramming patterns into and out of opposite ends of a flask in said position and a separate pattern actuating motor for each of said patterns.

26. In a pipe molding machine the combination with means for supporting a flask in a mold forming position, of separately movable main and end ramming patterns movable into and out of opposite ends of a flask in said position, and a separate pattern actuating motor for each of said patterns and controlling means for said motors located at the same operating station and adapted to be manipulated by a single attendant.

27. In a pipe molding machine the combination with means for supporting a flask in a mold forming position, of separately movable main, socket and spigot ramming patterns, actuating mechanism therefor comprising two motors located one at each end of said flask position and controlling means for said motors located at the same operating station and adapted to be manipulated by a single attendant.

28. In a pipe molding machine, a turn-table and a series of flasks provided with a plurality of mold cavities mounted thereon, each flask comprising a central part, forming a part of the wall about each mold cavity, directly secured to said turn-table, and inner and outer parts, movable radially of the turn-table away from said central part in opposite directions in opening the flask.

29. In a pipe molding machine, a turn-table and a series of flasks provided with a plurality of mold cavities mounted thereon, each flask comprising a central part, forming a part of the wall about each mold cavity, directly secured to said turn-table, and inner and outer parts, movable radially of the turn-table away from said central part in opposite directions in opening the flask, said central part being formed with arms on which said side parts are supported when the flask is opened.

30. In a pipe molding machine, a traveling flask support, vertical flasks mounted thereon, a ramming pattern axially insertible in and removable from said flasks, means supported independently of said flask support and located above the path of travel of said flasks for pulling said pattern out of the upper end of a flask in the mold forming operation, and a guide for the lower end of said pattern supported independently of said flask support and movable into and out of engagement with the lower end of the flask in which the pattern is inserted.

31. In a pipe molding machine, a traveling flask support, vertical flasks mounted thereon, a ramming pattern axially insertible in and removable from said flasks, means supported independently of said flask support and located above the path of travel of said flasks for pulling said pattern out of the upper end of a flask in the mold forming operation, a supporting structure at the side of the path of travel of said flasks, and a guide for the lower end of said pattern connected to said structure by a flexible suspension and movable into and out of engagement with the lower end of the flask in which the pattern is inserted.

LOUIS R. LEMOINE.

Copies of this patent may be obtained for five cents each, by addressing the "Commissioner of Patents, Washington, D. C."